UNITED STATES PATENT OFFICE.

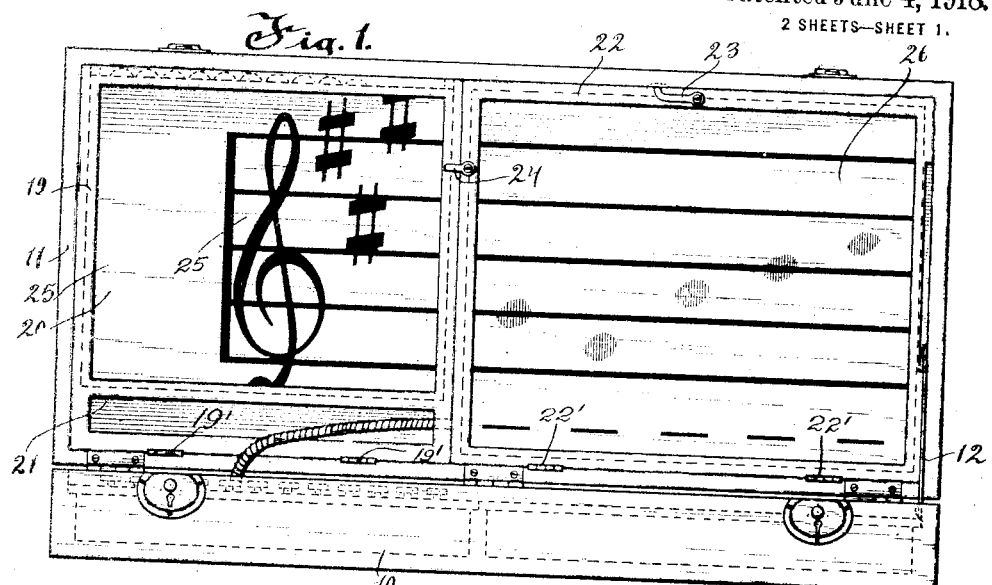

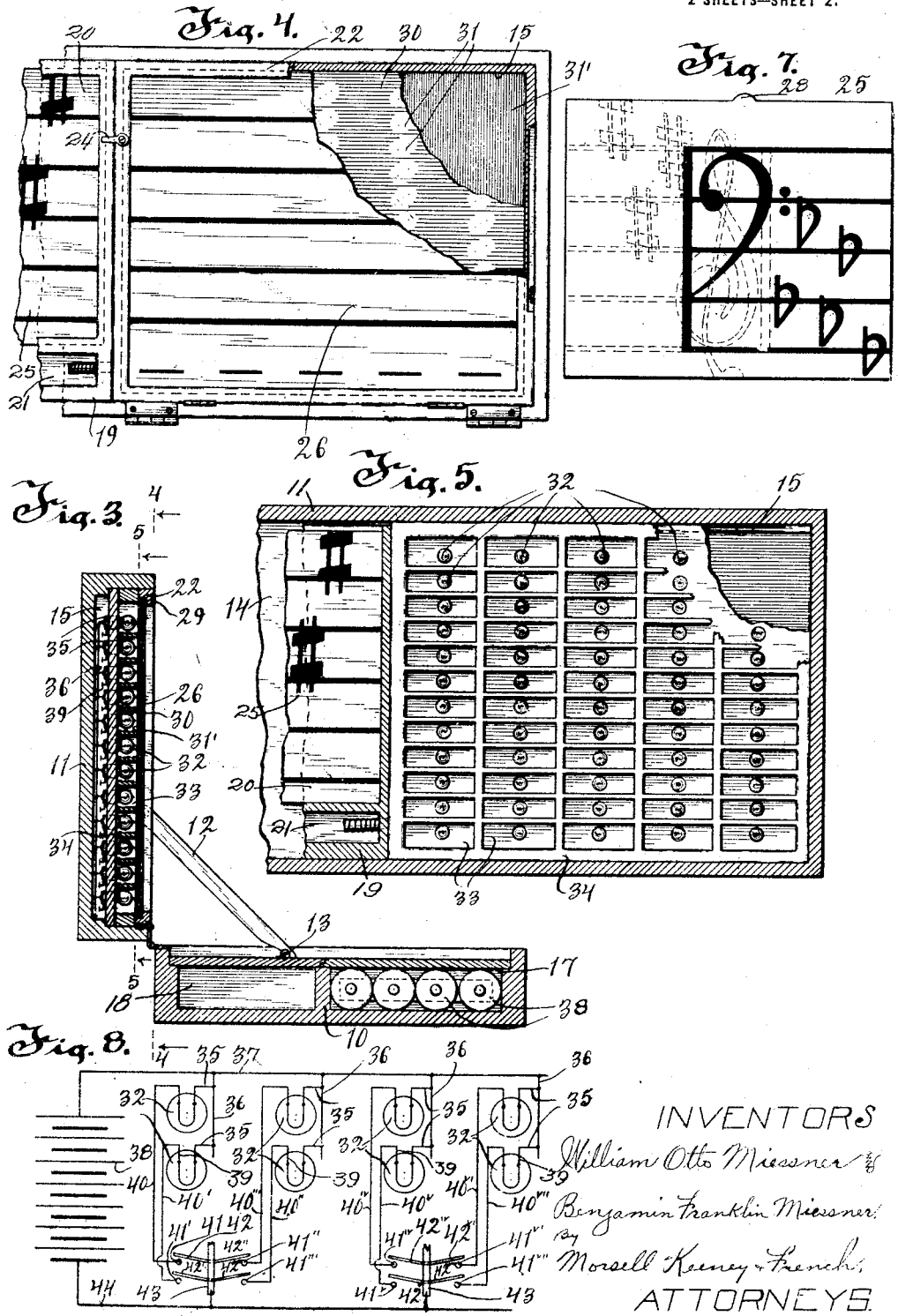

BENJAMIN FRANKLIN MIESSNER, OF WEST LAFAYETTE, INDIANA, AND WILLIAM OTTO MIESSNER, OF MILWAUKEE, WISCONSIN.

ELECTRIC MUSIC-CHART.

1,268,376.     Specification of Letters Patent.     Patented June 4, 1918.

Application filed November 3, 1915. Serial No. 59,349.

*To all whom it may concern:*

Be it known that we, BENJAMIN FRANKLIN MIESSNER, resident of West Lafayette, in the State of Indiana, and WILLIAM OTTO MIESSNER, resident of Milwaukee, in the county of Milwaukee and State of Wisconsin, both citizens of the United States, have invented new and useful Improvements in Electric Music-Charts, of which the following is a description, reference being had to the accompanying drawings, which are a part of this specification.

The invention relates to music charts.

The invention is designed more particularly to provide a music chart for training the student of music to appreciate tonal relationships.

The remarkable results obtained by the use of sight-word or phonetic cards in the teaching of language reading by the new sentence-word-phonetic reading led us to adopt a similar method in the teaching of music reading by the use of music-motif cards, each of said cards having a series or group of notes printed thereon. Through these cards the pupil gains a mastery of the groups of related tones or "motifs." Instead of seeing only the single, unrelated tones he learns to recognize instantly the staff-picture of note groups or types, and is able to read music several times faster than when he read by single notes. These music-motif cards give the pupil the visual concept of note groups, but their use is objectionable for the reason that it takes a great number of cards to form the desired combinations and it is difficult for the teacher to select any one card from among the number. To obviate the difficulties arising from the use of the charts this invention has been devised whereby a great number of different note groups may be shown upon a staff through the use of electrical means.

The invention is further designed to provide a chart in which notes may be made to appear in different groups.

The invention is further designed to provide a chart having a translucid sheet having a staff marked or otherwise shown thereon, and a note-carrying sheet and means for selectively illuminating the notes on said note-carrying sheet so as to make them appear upon the staff in different groupings.

The invention further consists in the several features hereinafter set forth and more particularly defined by claims at the conclusion hereof.

In the drawings:

Figure 1 is an elevation of the device embodying the invention;

Fig. 2 is a plan view thereof, parts being broken away and parts being shown in section;

Fig. 3 is a section taken on line 3—3 of Fig. 2;

Fig. 4 is a detail sectional view, taken on line 4—4 of Fig. 3, parts being broken away and parts being shown in section;

Fig. 5 is a section taken on line 5—5 of Fig. 3 parts being broken away;

Fig. 6 is a section taken on the line 6—6 of Fig. 2;

Fig. 7 is a view of one of the change signatures;

Fig. 8 is a diagrammatic view of system of wiring used in the device.

The device comprises a casing, a staff mounted therein, and means for showing a number of different note groups upon said staff.

The casing consists of two box sections 10 and 11 hingedly connected together. the section 10 forming the base section and the section 11 forming the cover and adapted to be moved down and locked to the section 10 or to be moved to a vertical position and be there secured by a hooked brace 12 pivotally secured at one end to said cover section 11 and detachably secured at its hooked end to the base section by a screw 13 Fig. 3. The cover section 11 has compartments 14 and 15 formed therein and the base section 10 has compartments 16, 17 and 18 formed therein Figs. 2, 3 and 5. An open top box-like frame 19 provided with openings 20 and 21 in the front thereof is hingedly secured by hinges 19' to said section 11 within the compartment 14, and a frame 22 is hingedly secured by hinges 22' to section 11 within the compartment 15 Figs. 1, 2 and 5. A latch 23 pivotally secured to the frame 22 is adapted to engage in a notch in the upper part of the section 11 to secure said frame in closed position and a latch 24 pivotally carried by the frame 22 is adapted to be moved into contact with the frame 19 to secure said frame in closed position with the frame 22 Fig. 1. Since the frames 19 and 22 are both hingedly secured at their lower edge to the box section 11 by the hinges 19' and 22' respectively it will be apparent that on the release of the latch 24 the frame 19 may be swung forwardly and out of the compartment 14 and that on the release of the latch 23 both frames 19 and 22 may be swung forwardly out of their respective compartments 14 and 15.

The staff consists of two parts, a signature carrying portion 25, carried by the frame 19, and a plain staff portion 26 mounted in the frame 22, the divisions of the staff on the portion 25 being in line with those on the portion 26 to form in effect a complete staff. In order that the different note groups may be shown on the staff in different keys, the portion 25 is made up of a plurality of cards, each card having a musical signature delineated thereon on both sides as shown in full lines in Fig. 7, the cards being designed to represent the signatures in the treble staff and bass staff, as shown in Figs. 1 and 7. These cards are carried in the box frame 19 which has grooved guides 27 therein adjacent the opening 20 so that any one of the cards may be slipped into said guides from the top of said box 19, Fig. 2. Each of the cards is provided with a tab 28 having printed or marked thereon, on both sides, references to the signatures which they carry and is arranged in index form, as shown in Fig. 2, so that any one may be readily selected by the teacher when the box-like frame 19 is swung forwardly on its hinges 19' out from the compartment 14 in the box section 11 and placed for display in the opening 20. The staff portion 26 is a sheet of transparent material having the staff lines marked thereon and is secured within the grooves 29 of the frame 22, Fig. 3.

The means for showing a number of different tone groups on said staff comprises a note-carrying sheet behind the staff, and means for selectively illuminating the notes in said sheet to make them appear on the staff.

The note carrying sheet consists of a sheet of transparent material 30 disposed in the frame 22 adjacent the staff portion 26. A plurality of sets of notes 31 are formed in said sheet by coating it with material so as to exclude light from all of its surface except that of the notes. In the present instance, I have shown five sets of notes spaced from each other lengthwise of the staff and twelve notes in each set. The notes in each set are so disposed on the sheet 30 as to be displayed on the lines and in the spaces of the staff so that any one or more desired notes of each set may be shown upon the staff. A piece of backing 31', preferably green colored translucent material, is disposed within the frame 22 behind the sheet 30.

The means for selectively illuminating the notes in the sheet 30 comprises a plurality of electric lights 32 and means for selectively controlling the operation of said lights.

The electric lights 32 are of the common bulb type and are arranged in a plurality of separate compartments 33, in a frame 34 within the compartment 15, one light being disposed behind each note 31 of the note-carrying sheet and each light being segregated from the others by the walls of the partitions forming the compartments. One terminal 35 of each of the lights in each set is connected to a common conductor 36 and these common conductors are connected in turn to a conductor 37 which leads to one side of the batteries 38 in the compartment 17. The terminal 39 of each of the lights is connected by its respective conductor, such as the conductors 40, 40', 40'' and 40''', to a switch contact, such as the switch contacts 41, 41', 41'' and 41'''. The other contacts 42, 42', 42'' and 42''' are connected to common conductor bars 43 and these common conductors are in turn connected to a conductor 44 which leads to the other side of the batteries 38, Figs. 2, 6 and 8.

The means for selectively controlling the operation of the lights comprises a plurality of circuit closers provided with push buttons 45 or keys, each of which is adapted to close the circuit through the light in its respective circuit. Yielding contacts 42, 42', 42'' and 42''' are connected to the conductor bars 43 and to the buttons 45 and are adapted to be moved into contact with the fixed contacts 41, 41', 41'' and 41''', the buttons 45 being slidably mounted in a plate 47 covering the compartment 16, Fig. 6. Each of the buttons has a letter marked thereon which corresponds to the note which the light in the circuit controlled by the button shows on the staff and as there are five sets of twelve different notes on the note-carrying sheet so there are five sets of twelve different push buttons which form a key-board for the operator, and in the present instance, the set of buttons adjacent the back edge of the box control the set of lights nearest the signature, and the next set of buttons control the next set of lights and so on, the set of buttons farthest away from the back edge of the box 10 controlling the set of lights farthest away from the signature.

The operation of the device is as follows: The teacher simultaneously presses the switch buttons in each set which she desires to have appear as a tone group on the staff. This establishes a flow of current from the batteries through the lamps controlled by said switches and the light from the lamps shining through the green translucent backing 31', the selected notes 31 and the transparent staff 26 display the notes on said staff in the desired position. The notes forming the desired group are thus simultaneously flashed upon the staff for the pupils to see. In the present instance the group of notes, shown in Fig. 1 may be made to appear by pressing at the same time the G button 46, the F button 51, the A button 48, the B button 49 and the C button 50.

The invention is not to be restricted to the details of construction herein set forth as it is our intention to claim the same as broadly as will be permitted by the state of the art.

What we claim as our invention is:—

1. A music chart comprising a staff, a note-carrying sheet disposed behind said staff and relatively immovable, and means for selectively displaying the notes on said sheet upon the staff in varying combinations to form different note groups.

2. A music chart comprising a translucid member having a staff thereon, a note-carrying sheet disposed behind the staff, and means for selectively illuminating the notes in said note-carrying sheet to display them on said staff in varying note groups.

3. A music chart comprising a casing, a staff formed by an exchangeable signature-bearing portion and a fixed transparent portion, a note-carrying sheet disposed behind said transparent portion, means for simultaneously and selectively illuminating different notes in said note-carrying sheet to display them on said transparent portion.

4. A music chart, comprising a transparent sheet having a staff delineated thereon, a note-carrying sheet disposed behind said transparent member, electrical means for simultaneously illuminating different notes in said note-carrying sheet to display them on said transparent portion to form a note group, and a key board for selectively controlling the operation of said illuminating means.

5. A music chart comprising a casing, a staff formed by an exchangeable signature bearing portion and a fixed transparent portion, a sheet having transparent portions in the form of notes disposed behind said transparent staff portion, an electric light behind each note of the note-carrying sheet, a source of current, an electrical circuit having a branch circuit between said source and each light, and a circuit-closure for controlling the operation of the light in each branch circuit.

6. A music chart comprising a casing, a changeable signature bearing portion and a fixed transparent portion having a staff thereon, a member having a plurality of transparent portions, the transparent portions being arranged in a plurality of rows, each of the transparent portions in each of the rows being located to appear as a note on the staff, and means for simultaneously illuminating a selected group of transparent portions to indicate notes upon the staff.

7. A music chart comprising a casing, a transparent member having a staff thereon, a member having transparent portions in the form of notes disposed behind said transparent member, a translucent backing disposed behind said note-carrying member and electrical means disposed behind said backing for illuminating the transparent notes to display them upon the staff, and means for selectively controlling the operation of said electrical means.

8. A music chart comprising a visible staff, a bank of electric lights disposed behind the staff, an electrical circuit including a source of current and electrical connections to the lights, means for causing rays of light from each of said lights to appear upon said staff in the form of a note, means in said circuit for selectively controlling the operation of said lights to form varying combinations of lights to display notes on said staff in different tone groups.

In testimony whereof, we affix our signatures, in presence of two witnesses.

BENJAMIN FRANKLIN MIESSNER.
WILLIAM OTTO MIESSNER.

Witnesses:
   O. L. BROWN,
   C. S. GEYER.

Copies of this patent may be obtained for five cents each, by addressing the "Commissioner of Patents, Washington, D. C."